April 29, 1952
B. E. HOUSE
2,595,143
BRAKE
Filed June 6, 1946
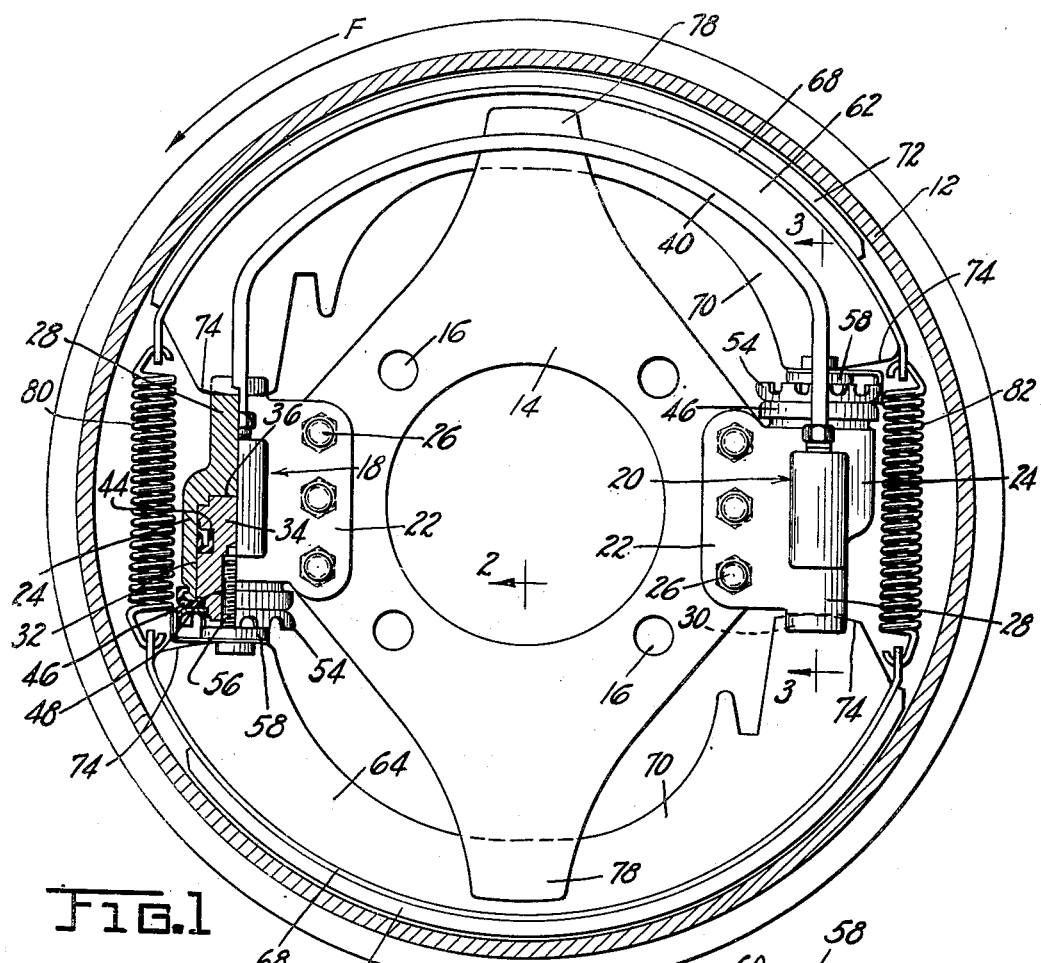
Fig.1
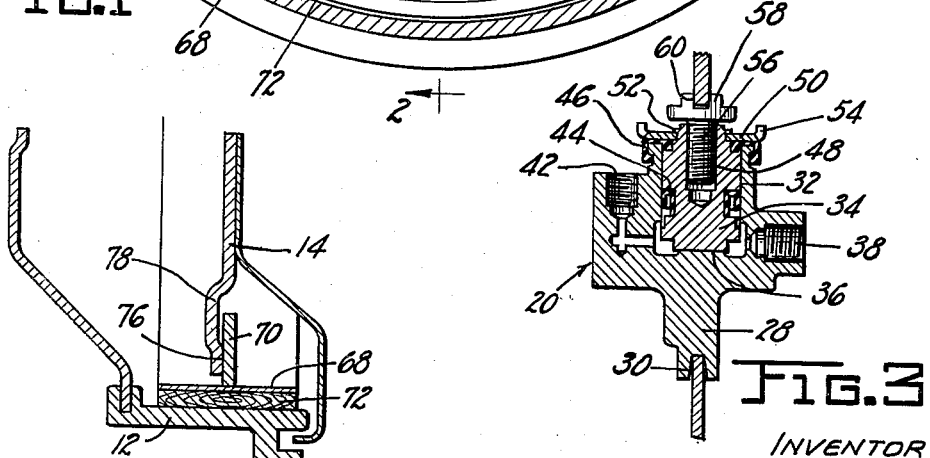
Fig.2
Fig.3
INVENTOR.
BRYAN E. HOUSE
BY T. J. Plante
ATTORNEY.

Patented Apr. 29, 1952

2,595,143

UNITED STATES PATENT OFFICE

2,595,143

BRAKE

Bryan E. House, South Bend, Ind., assignor to Bendix Aviation Corporation, South Bend, Ind., a corporation of Delaware Application June 6, 1946, Serial No. 674,772

2 Claims. (Cl. 188—78)

This invention relates to brakes, and particularly to brakes of the type in which one or more shoes are expanded into contact with a rotatable brake drum.

In Charles Patent No. 1,776,488 there is described and claimed a brake in which two individually self-energizing shoes are provided, which are self-energizing only in one direction of drum rotation. An arrangement of this general nature, in which the shoes are self-energizing in one direction only, provides a brake which is quite powerful in one direction, but relatively weak in the other direction. Such a brake can be very useful in certain installations, as on the front wheels of passenger cars, because the important braking effort is required when the vehicle is moving in a forward direction, and the front wheel brakes need not be very efficient during rearward movement of the vehicle, if satisfactory rear wheel brakes are provided. Although a brake in which the shoes are self-energizing in both directions of rotation constitutes a much more efficient brake in reverse, it is somewhat more expensive than the one-way type of self-energizing brake, and may therefore in some instances be replaced by the latter in order to reduce cost.

In general, it is the object of the present invention to provide an improved brake of the type in which the shoes are individually self-energizing in one direction only.

More specifically, it is an object of the present invention to provide a brake of the type under discussion in which the anchoring and applying forces are exerted in the plane of the supporting member, thereby eliminating twist or bending stresses on said member.

Another object of the present invention is to provide a brake of the type referred to in which the shoes engage their anchors in such a way as to permit either pivotal movement or sliding movement of the anchored ends of the shoes with respect to the anchors. This permits the shoes to move longitudinally during braking to compensate for any eccentricity of the shoes with respect to the drum and also simplifies the operation of adjusting the released portion of the shoes to compensate for lining wear.

Yet another object of the present invention is to provide, in a brake of the type under discussion, novel shoe-guiding means which maintain the shoes in the proper lateral position, both during braking and between brake applications.

Other objects and advantages of the present invention will become apparent during the course of the following description, reference being had therein to the accompanying drawing, in which:

Figure 1 is a side elevation of a brake assembly incorporating the invention, certain parts of the brake being shown in section; and Figures 2 and 3 are sections taken on the lines 2—2 and 3—3, respectively, of Figure 1.

The brake illustrated in the drawing includes the usual rotatable drum 12, and a supporting member or support plate 14 which has a plurality of openings 16 adapted to receive bolts which secure the support plate to a non-rotatable part of the vehicle, such, for example, as the conventional steering knuckle.

Located diametrically opposite one another and carried by the support plate 14 are two hydraulic actuators 18 and 20. The hydraulic actuators may, as shown, be secured to the support plate by means of flat flanges 22 which are integral with the casings 24 of the actuators, and which lie against the side of the support plate, a plurality of threaded fastening members 26 being utilized to connect the flanges of the respective actuators to the support plate. Preferably the flanges 22 are slightly offset from the center of the hydraulic actuators, in order that the axes of the bores of said actuators may lie in the plane of the body portion, or central portion, of the support plate 14.

Each of the casings 24 of the two hydraulic actuators (which are illustrated as identical in construction) is closed at one end by a wall 28, in the outer end of which is provided a flat bottomed substantially radially extending slot 30. The other, or open, end of each casing is provided with a cylindrical bore 32, in which reciprocates a piston 34. Pressure tending to move piston 34 away from its resting place against surface 36 of wall 28 is provided by fluid under pressure obtained from a suitable pressure source, such as the conventional master cylinder. Hydraulic actuator 20, which is shown in Figure 3, is connected through port 38 to the master cylinder, whereas hydraulic actuator 18 is connected through conduit 40 and port 42 to the interior of hydraulic actuator 20, the port in hydraulic actuator 18 which corresponds to port 38 of hydraulic actuator 20 being normally closed by means of the usual bleed screw, which can be removed to permit bleeding of the hydraulic system. A bleeding arrangement and operation suitable for this brake is described and claimed in Goepfrich and House application Serial No. 663,085, filed April 18, 1946, now Patent No. 2,466,425.

The piston 34 of each hydraulic actuator, which is provided with the usual annular seal 44 and rubber boot 46, also has an internally threaded opening 48 formed in its outer end and carries a plate 50 at its outer end which is secured to the piston by means of the upset flange 52 provided on the piston. The plate 50 has a plurality of teeth 54 adapted to receive a suitable adjusting tool. Screwed into the internally threaded opening 48 of the piston is an adjusting screw having a threaded stem 56 and an enlarged head 58 provided with a flat-bottomed slot 60.

The drum-engaging parts of the brake are two T-section shoes 62 and 64. The shoes are provided with rims 68 and strengthening webs 70, the rims having secured thereto the usual brake lining segments 72, and the webs having convexly curved end surfaces 74. Each of the shoes is guided, or in other words held in the proper lateral position, by having the central portion of its web in engagement with a surface 76 provided on an outwardly extending guide arm 78 of support plate 14, and by having one end extending into the slot 60 provided in the respective adjusting screw head and the other end extending into the slot 30 provided in the closed end portion 28 of the respective casing 24. It will be noted that the guide arms 78 of the support plate 14 are offset laterally to permit the shoe webs to lie in the plane of the center portion of the support plate (see Figure 2).

The shoes 62 and 64 are normally retained in released position (as shown) by means of two return springs 80 and 82 connected in tension between the ends of the shoe rims at opposite sides of the brake. The springs 80 and 82 are preferably laterally offset from the shoe webs in such a way as to provide a force holding the shoes in contact with the surfaces 76 of guide arms 78. This feature is discussed more fully in Goepfrich and House application Serial No. 663,084, filed April 18, 1946, now Patent No. 2,502,948 issued April 4, 1950.

Assuming that the arrow F represents the direction of drum rotataion when the vehicle is moving forwardly, then it will be apparent that both shoes 62 and 64 will be fully self-energizing, anchoring against the bottom surfaces of the slots 30, and being applied by the pistons 34. Owing to the novel anchoring expedient, which permits longitudinal movement of the shoes, the efficiency of operation of the brake is considerably improved. Of course, when the shoes are first moved outwardly into engagement with the brake drum by force transmitted through the piston 34, the shoes rock about their curved ends 74. Under normal circumstances, this rocking movement will probably suffice to bring the shoes into full engagement with the drum along the entire length of the lining. If, however, there is any tendency for the toe or heel of either shoe to engage the drum in advance of the other portions of the shoe, due to eccentricity of the shoe with respect to the drum, this situation is automatically remedied by sliding movement of the shoe along its anchor surface.

The provision of an anchoring arrangement of this type is also particularly valuable in simplifying the brake adjusting operation. In order to reduce the clearance between a given shoe and the drum, the respective piston 34 is rotated by inserting an adjusting tool, such as a screw driver, into one of the teeth 54 formed on the piston periphery and prying to effect rotational movement. Since the adjusting screw 56 is not capable of rotation because of its engagement with the shoe web, rotation of the piston causes axial movement of the adjusting screw and thus changes the released position of the shoe. During adjustment, the toe of the shoe is moved outwardly, causing the curved heel to roll on the anchor surface and bring the shoe into engagement with the drum. If one part of the shoe contacts the drum ahead of the other, longitudinal sliding movement of the shoe will permit full engagement to be obtained, after which the adjustor is backed off sufficiently to provide the minimum clearance.

Although a particular embodiment of my invention has been described, it will be understood by those skilled in the art that the object of the invention may be attained by the use of constructions different in certain respects from those disclosed without departing from the underlying principles of the invention. I therefore desire by the following claims to include within the scope of my invention all such variations and modification by which substantially the results of my invention may be obtained through the use of substantially the same or equivalent means.

I claim:

1. For use in cooperation with a rotatable brake drum, a brake comprising a support plate adapted to be secured to a non-rotatable member and having two integral outwardly extending axially offset guide arms located at opposite sides of the brake, two hydraulic actuators located at opposite sides of the brake substantially midway between the aforementioned guide arms and each comprising a casing closed at one end only and provided with a substantially radially extending flat-bottomed slot in the outer surface of said closed end, each casing having an integral flat flange by means of which it is secured to the support plate and a cylindrical bore at its open end which is on an axis lying in the plane of the support plate, a single piston reciprocable in the cylindrical bore of each casing, said piston having a threaded opening in its outer end and a toothed outer periphery, an adjusting screw associated with each piston having a threaded stem extending into the threaded opening of the piston and having a head provided with a flat-bottomed slot, two T-section shoes each having a strengthening web which lies in the plane of the support plate, each of said shoe webs centrally engaging one of the support plate guide arms and having convexly curved end surfaces, one of which extends into the slot provided in the head of one of the adjusting screws, and the other of which extends into the slot provided in the closed end of one of the casings and is capable of moving both pivotally on and sliding along the flat-bottomed surfaces of the slot, and return springs which urge the shoes toward retracted position and also hold the webs of the shoes in engagement with the supporting plate guide arms.

2. For use in cooperation with a rotatable brake drum, a brake comprising a support plate adapted to be secured to a non-rotatable member and having two integral outwardly extending axially offset guide arms located at opposite sides of the brake, two hydraulic actuators located at opposite sides of the brake substantially midway between the aforementioned guide arms and each comprising a casing closed at one end only and provided with a shoe-guiding slot in the outer surface of said closed end, each casing having an integral flat flange by means of which it is secured to the support plate and a cylindrical bore at its open end which is on an axis lying in the plane of the support plate, a single piston reciprocable in the cylindrical bore of each casing, said piston having a threaded opening in its outer end and a toothed outer periphery, an adjusting screw associated with each piston having a threaded stem extending into the threaded opening of the piston and having a head provided with a shoe-guiding slot, two T-section shoes each having a strengthening web which lies in the plane of the support plate, each of said shoe webs centrally engaging one of the support plate guide arms and having one end extending into the slot provided in the head of one of the adjusting screws and the other end extending into the slot provided in the closed end of one of the casing, and return springs which urge the shoes toward retracted position and also holds the webs of the shoes in engagement with the supporting plate guide arms.

BRYAN E. HOUSE.

REFERENCES CITED

The following references are of record in the file of this patent:

UNITED STATES PATENTS

| Number | Name | Date |
| --- | --- | --- |
| 1,967,382 | Taylor | July 24, 1934 |
| 2,041,463 | Frank | May 19, 1936 |
| 2,192,293 | Waseige | Mar. 5, 1940 |
| 2,245,682 | Kerr | June 17, 1941 |
| 2,313,432 | Goepfrich | Mar. 9, 1943 |
| 2,316,450 | Parnell | Apr. 13, 1943 |
| 2,322,121 | Frank | June 15, 1943 |
| 2,380,814 | Whitacre | July 31, 1945 |
| 2,475,492 | Goepfrich et al. | July 5, 1949 |